United States Patent [19]

Russell

[11] Patent Number: 5,238,877
[45] Date of Patent: Aug. 24, 1993

[54] CONFORMAL METHOD OF FABRICATING AN OPTICAL WAVEGUIDE ON A SEMICONDUCTOR SUBSTRATE

[75] Inventor: Stephen D. Russell, San Diego, Calif.

[73] Assignee: The United States of America as represented by the Secretary of the Navy, Washington, D.C.

[21] Appl. No.: 876,615

[22] Filed: Apr. 30, 1992

[51] Int. Cl.⁵ .................... H01L 21/469; B05D 5/12
[52] U.S. Cl. ............................ 437/231; 427/126.3; 385/8; 437/129
[58] Field of Search ................. 437/231, 230; 427/126.1, 126.2, 126.3, 126.4, 126.5, 126.6; 385/2, 8, 141

[56] References Cited

U.S. PATENT DOCUMENTS

| | | |
|---|---|---|
| 3,997,690 | 12/1976 | Chen . |
| 4,344,980 | 8/1992 | Yoder ........................... 437/161 |
| 4,801,184 | 1/1989 | Revelli . |
| 4,861,128 | 8/1989 | Ishikawa et al. . |
| 4,902,086 | 2/1990 | Henry et al. . |
| 4,934,774 | 6/1990 | Kalnitsky et al. . |
| 4,939,793 | 7/1990 | Stewart . |
| 5,028,455 | 7/1991 | Miller et al. .................. 427/126.3 |
| 5,052,771 | 10/1991 | Williams et al. . |
| 5,059,475 | 10/1991 | Sun et al. . |
| 5,100,764 | 3/1992 | Paulson et al. ............... 427/126.3 |
| 5,116,643 | 5/1992 | Miller et al. .................. 437/231 |
| 5,137,749 | 8/1992 | Yamazaki et al. ............ 427/126.3 |
| 5,139,820 | 8/1992 | Sawada et al. ................ 427/126.3 |

FOREIGN PATENT DOCUMENTS

| | | | |
|---|---|---|---|
| 221306 | 9/1988 | Japan | ...................... 385/8 |
| 341406 | 7/1989 | Japan . | |
| 359603 | 7/1989 | Japan . | |

Primary Examiner—Olik Chaudhuri
Assistant Examiner—Ramamohan Rao Paladugu
Attorney, Agent, or Firm—Harvey Fendelman; Thomas Glenn Keough

[57] ABSTRACT

A method for fabricating a conformal optical waveguide on a semiconductor substrate which results in an improved conformal processing method of producing ferroelectic ceramic waveguides that is integratable with conventional electronic and optoelectronic devices. First, a patterning of a desired waveguide configuration is made on a desired semiconductor substrate. A conformal confinement layer is fabricated in the pattern of the desired waveguide configuration on the semiconductor substrate. The conformal confinement layer has an index of refraction. Next, the method calls for a placing of a sol-gel waveguide precursor in the conformal confinement layer. Next the spin casting of a sol-gel waveguide precursor shapes a sol-gel conformal waveguide layer in the conformal confinement layer on the semiconductor substrate. The annealing of the spin cast sol-gel conformal waveguide layer forms the conformal optical waveguide which has an index of refraction that is greater than the refractive index of the conformal confinement layer.

17 Claims, 1 Drawing Sheet

CONFORMAL METHOD OF FABRICATING AN OPTICAL WAVEGUIDE ON A SEMICONDUCTOR SUBSTRATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Ferroelectrics have received considerable interest due to their applicability for a number of potential technologies. In bulk form they have high permitivities (dielectric constant), have large electromechanical coupling coefficients, exhibit pyroelectric behavior, and have electro-optic effects. In thin-film form they have potential applications for optical waveguides, optical modulators and shutters, optical displays and memories, piezoelectric transducers, decoupling capacitors, pyroelectric detectors and ferroelectric memories. Of particular interest is the integration of passive optical devices (e.g. waveguides) with active electro-optic devices (e.g. modulators) and conventional microelectronic devices for optoelectronic integrated circuits (OEICs).

In recent years, researchers have fabricated various thin-film waveguides for integrated optical devices. Titanium-diffused lithium niobate waveguides have been studied; however, problems with optical damage and weak electro-optic effects have limited their practical use, as noted in "A New Waveguide Switch-/Modulator for Integrated Optics", by W. E. Martin, *Appl. Phys. Vol.* 26 (1975), p. 562; "Optical Channel Waveguide Switch and Coupler Using Total Internal Reflection", by C. S. Tsai et al., *IEEE J. Quantum Electron.*, Vol. QE-14, (1978), p. 513; and "Optical Damage Resistance of Lithium Niobate Waveguides", by R. L. Holman et al. *Opt. Eng.*, Vol. 21 (1982), p. 1025. Fabrication of thin-film lanthanum-modified-lead-zirconate-titanate (PLZT) ferroelectric ceramics have been proposed to overcome the limitations exhibited by lithium niobate. Such thin-films have been formed by rf planar magnetron sputtering of a powder target onto a sapphire substrate, see, for example, "Electro-optic Effects of (Pb,La)(Br,Ti)$O_3$ Thin Films Prepared by rf Planar Magnetron Sputtering", by H. Adachi et al., *Appl. Phys. Lett.*, Vol. 42 (983), p. 867; and "PLZT Thin-film Waveguides", by T. Kawaguchi et al., *Appl. Optics.*, Vol. 23 (1984), pp. 2187-2191. Ridge-type channel waveguides have been fabricated using ion-beam etching techniques. These techniques are necessary since there is no suitable conventional etchant for PLZT films, and high temperature processes can result in out-diffusion of lead from the thin film, as noted in above reference by Kawaguchi. Ion beam etching techniques have a number of limitations, however: (1) etching selectivity between the thin-film and the photoresist mask is poor (typically 1.2:1), (2) etch rates are low (typically 13 nm/min), (3) typical etch non-uniformities are large ($\pm 10\%$), and (4) there is limited control of the resulting surface quality. These limitations inhibit low cost, high yield fabrication of integrated devices and also affect device performance. For example, optical propagation losses from surface scattering from roughened top surface or sidewalls in waveguides must be controlled to obtain useful optical structures, note the article by D. Marcuse, "Mode Conversion Caused by Surface Imperfection of a Dielectric Slab Waveguide", *Bell Syst. Tech. J.*, Vol. 48 (1969), p. 3187.

Recent advances in polymeric solution-gelation (sol-gel) processing of ferroelectric ceramics offers new hope for integrated waveguides. Research in sol-gel processing has addressed the requirements of fabricating ferroelectric ceramics for electronic applications such as high permitivity dielectrics, non-volatile memory elements or optical image storage such as that shown in the articles "Sol-Gel-Derived PbTiO$_3$" by Blum et al., *J. Mater. Sci.*, Vol. 20 (1985), pp. 4479–4483; "PbTiO$_3$ Films from Metalloorganic Precursors" by R. W. Vest et al., *IEEE Trans.* UFFC, Vol. 35 (1988), pp. 711-717; "Integrated Sol-Gel PZT Thin-Films on Pt, Si, and GaAs for Non-Volatile Memory Applications" by S. K. Dey et al., *Ferroelectrics*, Vol. 108 (1990), pp. 37-46; and "Thin-Film Ferroelectrics of PZT by Sol-Gel Processing" by S. K. Dey et al., *IEEE Trans.* UFFC, Vol. 35 (1988), pp. 80-81. The sol-gel procedure involves the synthesizing of precursor complexes by vacuum distillation of metalloorganic compounds. The precursor complexes are subsequently hydrolyzed and condensed to form stable polymeric solutions which can be spin cast on substrates using conventional techniques. The resulting thin-film precursors undergo a low temperature annealing to volatilize organics, and are annealed at higher temperatures to crystallize and densify the film, see the first cited by Dey et al. article above, and pending USPTO application Ser. No. 07/709,671 by S. D. Russell et al. "Method of Laser Processing Ferroelectric Materials". Extensions of the existing chemistry can be envisioned by one skilled in the art to include the addition of a lanthanum-based compound in the formation of a PLZT sol-gel precursor film or other useful optical ceramics.

Thus, in accordance with this inventive concept a need has been recognized for a method using the sol-gel process described above in operative association with a predetermined sequence of process steps for fabricating a "waveguide mold" which results in an improved conformal processing method of producing ferroelectic ceramic waveguides that is integratable with conventional electronic and optoelectronic devices.

SUMMARY OF THE INVENTION

The present invention is directed to providing a method for fabrication of an integratable conformal optical waveguide on a semiconductor substrate. First, a patterning of a desired waveguide configuration is made on the semiconductor substrate. A fabricating of a conformal confinement layer in the pattern of the desired waveguide configuration is made on the semiconductor substrate, the conformal confinement layer having an index of refraction. Next, the method calls for a placing of a sol-gel waveguide precursor in the conformal confinement layer. A spin casting of the sol-gel waveguide precursor and the semiconductor substrate is effected suitably to shape a sol-gel conformal waveguide layer in the conformal confinement layer on the semiconductor substrate. A two step annealing procedure transforms the spin cast sol-gel conformal waveguide layer to the conformal optical waveguide for the optical transmission of data. The conformal optical waveguide has an index of refraction that is greater than the refractive index of the conformal confinement layer.

An object of the invention is to provide an improved method for delineating a waveguide structure using conventional semiconductor processing techniques with conventional materials.

Another object is to provide a method for delineating a waveguide structure that reduces fabrication costs with an increased yield.

Another object is to provide a conformal waveguide fabrication process to provide a crytallographically smooth surface that reduces surface scattering from the waveguide to thereby improve performance.

Yet another object is to provide a waveguide delineating technique which is compatible with conventional VLSI fabrication techniques and devices to make the technique integratable with electronic devices on the same chip for opto-electronic integrated circuits.

Another object is to provide a method for delineating a waveguide structure that allows the use of novel optical ceramics in an improved manufacturable process.

Still another object is to provide a method for delineating a waveguide structure relying on the use of a metallic buffer layer (for example aluminum on silicon) to provide an optically confining material that can be suitably patterned for the fabrication of active opto-electronic devices, such as an optical modulator or optical switch, for example.

Another object of the invention is to provide a conformal process that allows extensions to multilayer waveguides without changes to the overall process.

Another object is to provide a method for fabricating a conformal optical waveguide that may be monolithically integrated with other electro-optic devices and conventional electronics.

Another object is to provide a method of fabricating a passive or active waveguide structure for monolithic electro-optic, photonic and electronic integration using conformal processing techniques;

Another object is to provide a fabrication method beginning with the step of fabricating a form or mold using well-established photolithographic and etching processes on the substrate, buffer layer and/or electrode layer or alternately the laser-assisted etching techniques as opposed to the conventional difficult steps of patterning waveguides in ceramic materials.

Another object is to provide fabrication steps following the creating of the form or mold whereby the waveguide material (or its appropriate precursor) is spin cast or deposited in a form filling manner (conformally) followed by processing required to achieve the desired optical, electro-optical, photonic, mechanical and/or electrical properties.

Another object is to provide a method of fabricating waveguide structures using solution-gelation (sol-gel) processing techniques which includes the spin casting on a room temperature substrate of a precursor film, and subsequent low temperature processing by furnace, rapid thermal annealing, or laser annealing that is compatible with monolithically integrated electronic devices.

Another object is to provide a method of fabricating waveguide devices with lower losses (due to improved surface quality and fewer voids), higher electro-optic coefficients (due to better stoichiometry), allowing efficient and novel device integration (due to low temperatures amenable with electronic devices), and by a more reliable and inexpensive fabrication process (using the sol-gel processing).

These and other objects of the invention will become more readily apparent from the ensuing specification and claims when taken in conjunction with the attached drawings.

DESCRIPTION OF THE PREFERRED EMBODIMENT

The method for fabricating a conformal optical waveguide may be monolithically integrated with other electro-optic devices and conventional electronics on a substrate. The substrate material, typically a semiconductor, such as silicon, germanium, gallium arsenide, indium phosphide, and related compounds and alloys, will be used for the creation of associated electronic and opto-electronic integrated circuitry and is patterned using well-established conventional lithography and etching processes. The patterning delineates the waveguide structure, and the patterned semiconductor substrate essentially is used as a mold for the fabrication of the waveguide itself.

For proper confinement of the traveling light within the waveguide, the surrounding refractive indices of the substrate and environment must be less than the refractive index of the waveguide itself. The refractive index, in general, is a function of wavelength, temperature, crystallographic orientation, and inherently, the composition of the waveguide. These parameters are taken into consideration with specific design requirements for the job at hand and will be suitably tailored by one skilled in the art of waveguide design. Some optical designs may find it advantageous to provide a conformal buffer layer with appropriate optical confining characteristics between the substrate and the waveguide to form a "waveguide mold" (see, for example, the preferred embodiment below). Following the completion of this "waveguide mold", the sol-gel process referred to above may be called on to form the optical waveguide to conformably fill the mold. One or more layers of the optical material may be spin cast and annealed to create a desired thickness and structure. The final structure may undergo the subsequent additional processing associated with optically interconnected electro-optical components if desired.

Figure 1:
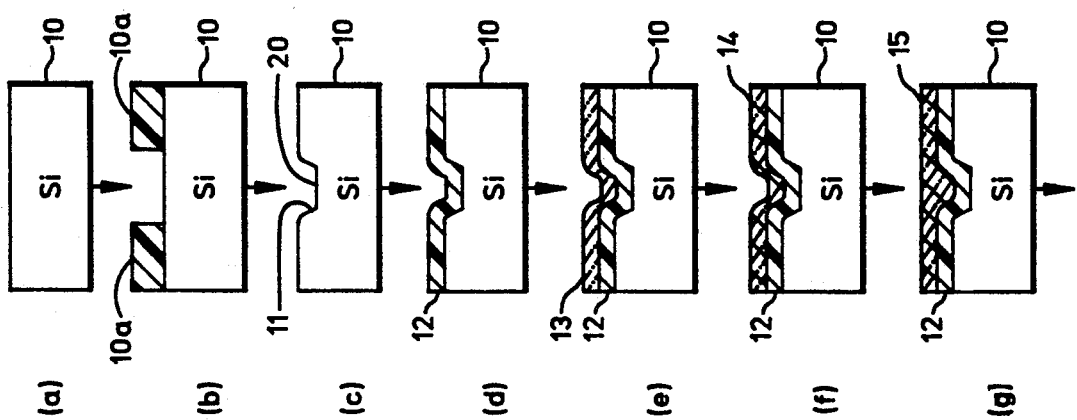
FIGS. 1 (a) through 1(g) depict the processing steps in the fabrication of an optical conformal waveguide on a semiconductor substrate as per this inventive concept.

Referring to FIGS. 1 (a) through 1 (g), a fabrication of a PLZT waveguide 15 is depicted in a cross-sectional view. A top planar view is not shown, but may be suitably designed as a single waveguide, waveguide splitter, waveguide combiner, star coupler, tapered and chirped waveguides, and other designs used in the art. The substrate 10 is selected, FIG. 1 (a) and it may be a (100)-oriented silicon (bulk or silicon-on-insulator/sapphire) substrate 10 that is patterned using a photoresist 10a subjected to a conventional lithography and etching processes, see FIG. 1 (b). For example, a potassium hydroxide etch of (100)-oriented silicon 10 anisotropically etches to a crystal plane 11 leaving a mirror smooth surface at an angle of 54.7 degrees with respect to the horizontal, as shown in FIG. 1 (c). This etch may be performed as detailed in the articles, "Chemical Etching and Slice Cleanup of Silicon" by K. E. Bean, Ch. 4, in G. E. McGuire, ed., *Semiconductor Materials and Processing Technology Handbook*. Noyes Publications, NJ (1988), pp. 126–190; and "Micromachining of Silicon Mechanical Structures" by G. Kaminsky, *J. Vac. Sci. Technol. B*, vol. 3 (1985), pp. 1015–1024. The etch results in a delineation of waveguide mold 20 for fabrication of waveguide 15.

Next, a conventional deposition process, e.g. low temperature oxidation (LTO) is used to form a conformal SiO$_2$ buffer layer 12 for optical confinement of the conformal waveguide or metalized layer, if desired, to be produced, see FIG. 1 (d). Conformal buffer layer 12 that is deposited in the etched waveguide mold 20 provides a conformal smooth layer with a refractive index less than a PLZT waveguide material to be applied as the waveguide. Refractive indices of some useful semiconductor substrate, conformal insulator buffer layer, ceramic waveguide and metalizing layer materials that can be used within the scope of this inventive concept are listed in Table I, ( also see the articles by E. W. Palik, ed., *Handbook of Optical Constants of Solids*, Academic Press, San Diego, Calif. (1985) pp. 341, 398–0400, 438–439, 473–474, 565–566, 700, 760, 774; and by C. E. Land et al., "Electrooptic Ceramics", in R. Wolfe, Ed., *Applied Solid State Science: Advances in Materials and Device Research*, Vol. 4, Academic Press, NY (1974), pp. 191–193, 198–205.

TABLE I

| Class | Material | Index (n) | Wavelength |
|---|---|---|---|
| Semiconductor | Si | 3.882 | 0.6326 |
| | | 3.5007 | 1.372 |
| | | 3.4784 | 1.532 |
| | Ge | 5.5 | 0.6358 |
| | | 4.285 | 1.378 |
| | | 4.275 | 1.550 |
| | GaAs | 3.856 | 0.6326 |
| | | 3.3965 | 1.378 |
| | | 3.3737 | 1.550 |
| Metal | Al | 1.39 | 0.6358 |
| | | 1.26 | 1.378 |
| | | 1.44 | 1.550 |
| | Pt | 2.38 | 0.6525 |
| | | 4.50 | 1.305 |
| | | 5.31 | 1.550 |
| Insulator | SiO$_2$ | 1.45671 | 0.643847 |
| | | 1.44621 | 1.3622 |
| | | 1.44427 | 1.52952 |
| Navy Case No. 73,650 | Si$_3$N$_4$ | 2.022 | 0.6199 |
| | | 1.998 | 1.240 |
| Ceramic | PLZT/PZT | ~2 – ~100 depending on composition, temperature, structure and wavelength | |
| | LiNbO$_3$ | $n_o(\perp) = 2.2835$ | 0.64385 |
| | | $n_e(\|\|) = 2.2002$ | |
| | | $n_o(\perp) = 2.2211$ | 1.29770 |
| | | $n_e(\|\|) = 2.1464$ | |
| | | $n_o(\perp) = 2.2113$ | 1.60 |
| | | $n_e(\|\|) = 2.1361$ | |

References: E. W. Palik, ed., and C. E. Land et al., as cited above.

An alternative to the LTO process may be a thermally grown oxide or nitride on silicon; however, these processes and materials may impose additional constraints for variations in growth conditions and waveguide design in order to achieve a smooth conformal buffer layer. In some instances, optical transmission losses from non-conformal buffer layers may be within acceptable limits so that the addition of alternative buffer layers may be appropriate. Note, depending on the job at hand, one may omit buffer layer 12 if substrate 10 provides a suitable confining of the optical wave in waveguide 15.

Sol-gel preparation of the PLZT waveguide material 14 follows in accordance with practices established in the art, noting the articles by Blum et al., R. W. Vest et al. and the two articles by S. K. Dey et al. The sol-gel precursor is applied to waveguide mold 20 and spin cast forming a conformal layer 13 in waveguide mold 20, formed in buffer layer 12 and substrate 10, see FIG. 1 (e). The spin casting typically is done at 2000 rpm and forms a layer ~0.2 μm thick. The thickness of conformal precursor layer 13 is a function of the sol-gel viscosity and the spin cast speed and time to provide variation in the desired configuration.

Conventional annealing of precursor layer 13 forms the polycrystalline ceramic layer 14, see FIG. 1 (f). The annealing is typically done in two steps, first, a low temperature annealing at 250° C. for 1 hour to volatilize organics, and, second, a high temperature annealing at 550° C. for 30 min to densify and crystallize the film. Repetition of the spin-on process and annealings can be performed to achieve the integrable conformal waveguide 15 of the desired thickness and structure, note FIG. 1 (g). Typical values that may be desired for a waveguide geometry are about 20 μm wide and 1 μm thick although other dimensions may be required for specific device designs. If desired, additional material layers may be deposited and/or patterned for confining or modulating effects. The conformality of this process allows for design of multiple alternating layers with no modifications to the process. Similarly, patterning of the ceramic using the techniques described in the pending S. D. Russell et al. patent application, vide supra, or other techniques may be desired.

Figure 2:
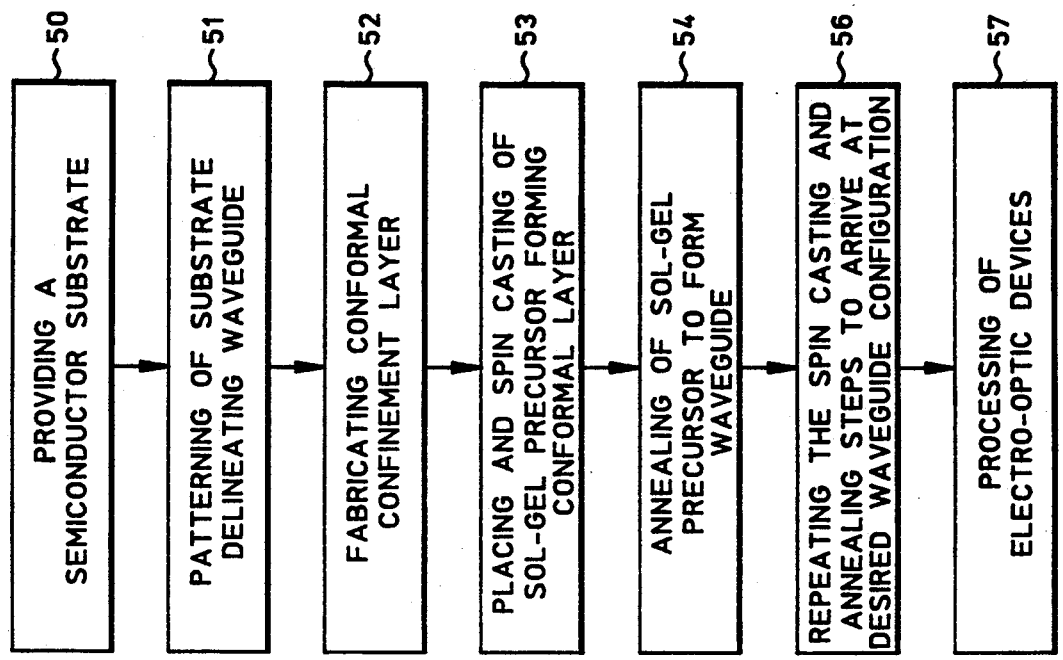
FIG. 2 depicts the steps of the method of fabrication of a conformal waveguide in accordance with this inventive concept.

Referring now to FIG. 2 of the drawings, the method of fabricating a conformal waveguide for optical and electronic integration is set forth in a functionally interrelated sequence of steps. First, there is the providing 50 of a suitable semiconductor substrate 10 such as silicon, germanium, gallium arsenide, etc., which has a discrete refractive index at a wavelength of interest, to establish a substrate on which optoelectronic as well as electronic components can be built up in accordance with well-known integrated circuit fabrication techniques. The substrate material is selected for a particular application so that its refractive index is less than the refractive index of the particular waveguide material selected, such as PLZT, PZT or LiNbO$_3$, for example. Patterning 51 of the substrate using conventional techniques delineates a waveguide structure to be formed. The configuration of the pattern itself may essentially function as a mold for the waveguide. Fabricating 52 a conformal buffer or confinement layer 12 of an appropriate material in the pattern on the substrate forms a waveguide mold 20. The fabrication of the buffer or conformal confinement layer can be done by a conventional low temperature oxidation, deposition process, of silicon dioxide or silicon nitride, for example, that has a refractive index less than the waveguide material such as PLZT or LiNbO$_3$, for example. Optionally, metalized layers of aluminum or platinum, for example, could be appropriately deposited for interconnection of other circuit components either before or after the conformal confinement layer is placed. Placing and spin casting 53 the sol-gel precursor material in the waveguide mold established by the conformal buffer confinement layer (or metalized layer) creates a precursor layer 13 that conforms to the conformal layer. The spin casting of a typical sol-gel precursor may be done at about 2000 rpms to form a layer approximately 2 microns thick. Since the thickness of the conformal precursor layer is a function of the sol-gel viscosity as well as the spin cast speed and time, the thickness and configuration may be changed to accommodate a particular need. A subsequent annealing 54 of the sol-gel precursor cures the polycrystalline ceramic layer 14 and may be a two-step operation. First, a low temperature annealing volatizes organics, typically at about 250° C. for one hour and, second, a high temperature annealing densifies and crystallizes the ceramic layer 14, typically at about 550° C. for 30 minutes.

After spin casting and annealing, a repeating 56 of the spin casting and annealing steps will allow a designer to arrive at a desired conformal waveguide configuration 15. The foregoing procedure allows a subsequent processing 57, such as metalization, or completion of other desired electro-optic devices or electronic circuitry devices as desired.

This method of fabrication provides for an uncomplicated method to delineate the waveguide structure using conventional semiconductor processing techniques in conventional materials as opposed to processing the ceramics themselves to thereby reduce fabrication costs and increasing yield. Furthermore, the conformal nature of the fabrication process provides a crystallographically smooth surface eliminating surface scattering from the waveguide, thereby improving performance. This method of fabrication also is compatible with conventional VLSI fabrication techniques and devices, making it integratable with electronic devices on the same chip for optoelectronic integrated circuits. It also allows the use of novel optical ceramics in an improved manufacturable process. The use of a metallic buffer layer (e.g. aluminum on silicon) provides an optically confining material that can be suitably patterned within the scope of this invention for the fabrication of active optoelectronic devices, for example an optical modulator or switch. Also, this conformal process easily allows extensions to multilayer waveguides without changes to the overall process.

As described above, variations in materials parameters and geometry as required for the job at hand can be easily accommodated by this process.

Obviously, many other modifications and variations of the present invention are possible in the light of the above teachings. It is therefore to be understood that within the scope of the appended claims the invention may be practiced otherwise than as specifically described.

I claim:

1. A method of fabricating a conformal optical waveguide on a semiconductor substrate comprising:
   providing a semiconductor substrate;
   patterning a desired waveguide configuration on said semiconductor substrate;
   fabricating a confinement layer conformably covering said semiconductor substrate having said desired waveguide configuration in the pattern of said desired waveguide configuration on the semiconductor substrate, said confinement layer replicating said desired waveguide configuration and said confinement layer having an index of refraction;
   spin casting a sol-gel waveguide precursor on said confinement layer in said desired waveguide configuration on said semiconductor substrate; and
   annealing said waveguide precursor to form said optical waveguide conformably covering said desired waveguide configuration on said semiconductor substrate, said optical waveguide having an index of refraction that is greater than the refractive index of said confinement layer.

2. A method according to claim 1 in which the step of fabricating is the depositing of the confining layer.

3. A method according to claim 1 in which the step of annealing is a low temperature annealing to volatize organics and a high temperature annealing to densify and crystalize said waveguide precursor into said optical waveguide.

4. A method according to claim 3 further including:
   repeating the steps of spin casting and annealing to provide a conformal optical waveguide of the desired dimensions.

5. A method of fabricating a conformal optical waveguide on a semiconductor substrate comprising:
   providing a semiconductor substrate;
   patterning a desired waveguide configuration on said semiconductor substrate;
   fabricating a confinement layer conformably covering said semiconductor substrate having said desired waveguide configuration in the pattern of said desired waveguide configuration on the semiconductor substrate, said confinement layer replicating said desired waveguide configuration and said confinement layer having an index of refraction;
   fabricating said semiconductor substrate and a sol-gel waveguide precursor on said confinement layer in said desired waveguide configuration on said semiconductor substrate; and
   annealing said waveguide precursor to form said optical waveguide conformably covering said desired waveguide configuration on said semiconductor substrate, said optical waveguide having an index of refraction that is greater than the refractive index of said confinement layer.

6. A method for fabricating a conformal optical waveguide on a semiconductor substrate comprising:
   providing a semiconductor substrate having an index of refraction;
   patterning a desired waveguide configuration on said semiconductor substrate;
   placing a sol-gel waveguide precursor in the desired waveguide configuration on the semiconductor substrate;
   spin casting a sol-gel waveguide precursor in said desired waveguide configuration on the semiconductor substrate; and
   annealing said waveguide precursor to form said optical waveguide conformably covering said desired waveguide configuration on said semiconductor substrate, said optical waveguide having an index of refraction that is greater than the refractive index of said semiconductor substrate.

7. A method according to claim 6 in which the step of annealing is a low temperature annealing to volatize organics and a high temperature annealing to densify and crystalize said waveguide precursor into said optical waveguide.

8. A method according to claim 7 further including:
   repeating the steps of spin casting and annealing to provide a conformal optical waveguide of the desired dimensions.

9. A method of fabricating a conformal optical waveguide on a semiconductor substrate comprising:
   providing a semiconductor substrate having an index of refraction;
   patterning a desired waveguide configuration on said semiconductor substrate;

spin casting a sol-gel waveguide precursor in said desired waveguide configuration on said semiconductor substrate; and annealing said waveguide precursor to form said optical waveguide conformably covering said desired waveguide configuration on said semiconductor substrate, said optical waveguide having an index of refraction that is greater than the refractive index of said semiconductor substrate.

10. A method according to claim 1 in which the step of patterning includes photolithographically creating a masking layer, etching said semiconductor substrate in the exposed region of the masking layer thereby defining said desired waveguide configuration, and subsequent removal of the masking layer.

11. A method according to claim 10 in which the etching is anisotropicaly applied to said semiconductor substrate and selective to one or more crystallographic planes of said semiconductor substrate.

12. A method according to claim 1 in which said semiconductor substrate is (100)-oriented silicon and said etching is the chemical dissolution in a potassium hydroxide solution.

13. A method according to claim 11 in which said semiconductor substrate is (100-oriented silicon and said etching is the chemical dissolution in a potassium hydroxide 14. A method according to claim 3 in which said low temperature heating is no higher than about 400° C. and said high temperature heating is no higher than about 700° C.

15. A method according to claim 4 where each of said conformal layers has a thickness of less than ten micrometers.

16. A method according to claim 1 further including:
fabricating a confinement capping layer on said waveguide layer, said confinement capping layer having an index of refraction less than the refractive index of said waveguide layer.

17. A method according to claim 1 further including:
repeating the steps of spin casting and annealing to provide a conformal optical waveguide of the desired dimensions.

* * * * *